Nov. 9, 1926.
A. N. SPANEL
1,605,993
RENOVATING DEVICE
Filed Feb. 15, 1926    3 Sheets-Sheet 1
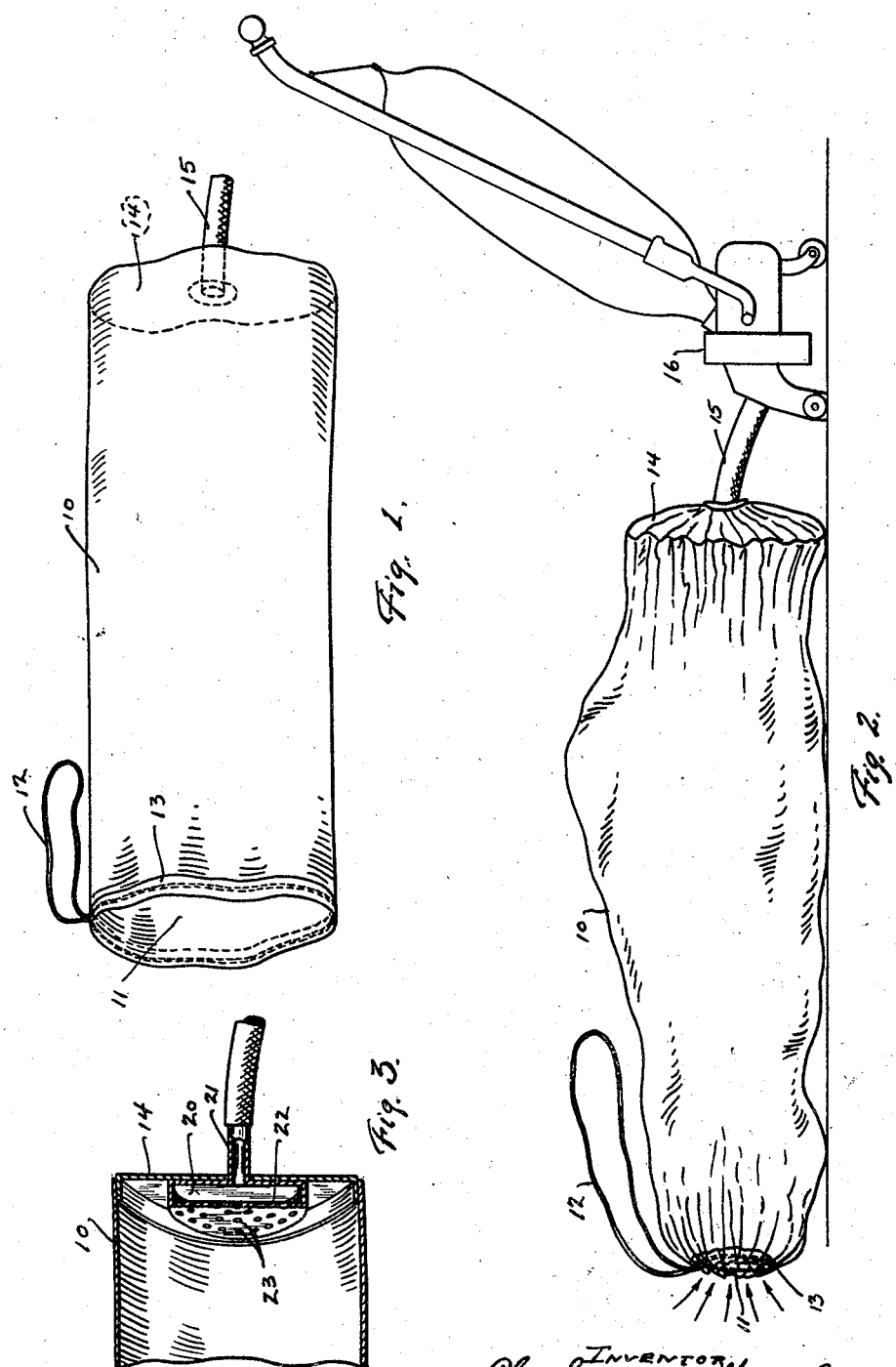

Nov. 9, 1926.
A. N. SPANEL
1,605,993
RENOVATING DEVICE
Filed Feb. 15, 1926      3 Sheets-Sheet 2
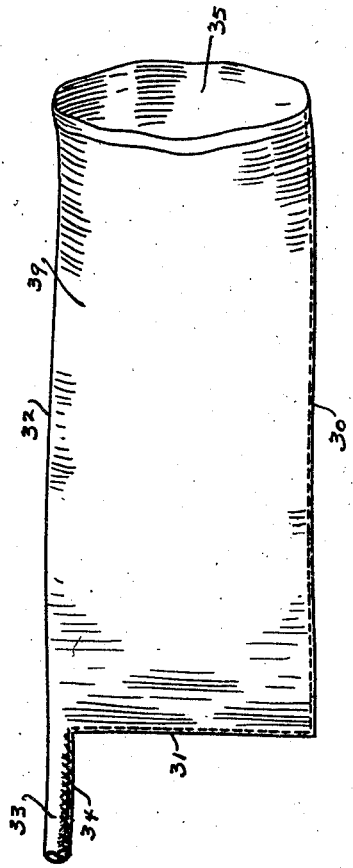
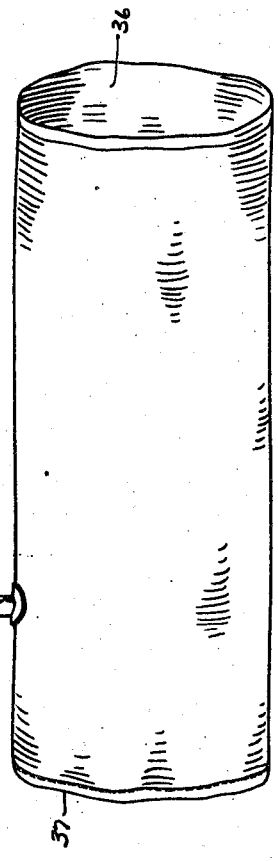
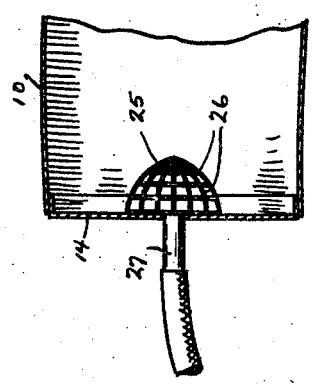

Nov. 9, 1926.

A. N. SPANEL
RENOVATING DEVICE
Filed Feb. 15, 1926

INVENTOR
Abraham N. Spanel
By
Ellis
ATTORNEY

Patented Nov. 9, 1926.

1,605,993

UNITED STATES PATENT OFFICE.

ABRAHAM N. SPANEL, OF ROCHESTER, NEW YORK.

RENOVATING DEVICE.

Application filed February 15, 1926. Serial No. 88,189.

My invention relates in general to renovating devices, and more particularly to such a device which is designed to be used in connection with a suction device, such as a vacuum cleaner.

The principal object of my invention has been to provide a device whereby it shall be possible to renovate clothing, pillows, blankets, bedding, draperies, and the like.

Another object has been to provide a device which shall be so convenient to use that the work of renovating may be thoroughly and efficiently completed in a comparatively short space of time and in a dustless manner, without harm to the articles being renovated.

Moreover, with my device, the renovating may be accomplished without any attention on the part of the operator, after the articles to be renovated have been placed within the device.

Furthermore, my device is inexpensive to manufacture and is simple to use, and it affords a very sanitary and economical means of efficiently and thoroughly aerating articles.

The above objects and advantages have been accomplished by the device shown in the accompanying drawings, of which:

Fig. 1 is a perspective view of one form of my device.

Fig. 2 is a perspective view of the device showing it in operation.

Fig. 3 is a fragmentary, perspective, sectional view of a modified form of invention.

Figs. 4 and 5 are fragmentary, sectional views of other modifications of my device.

Figs. 6 and 7 are perspective views of modified forms of invention.

Figure 8:
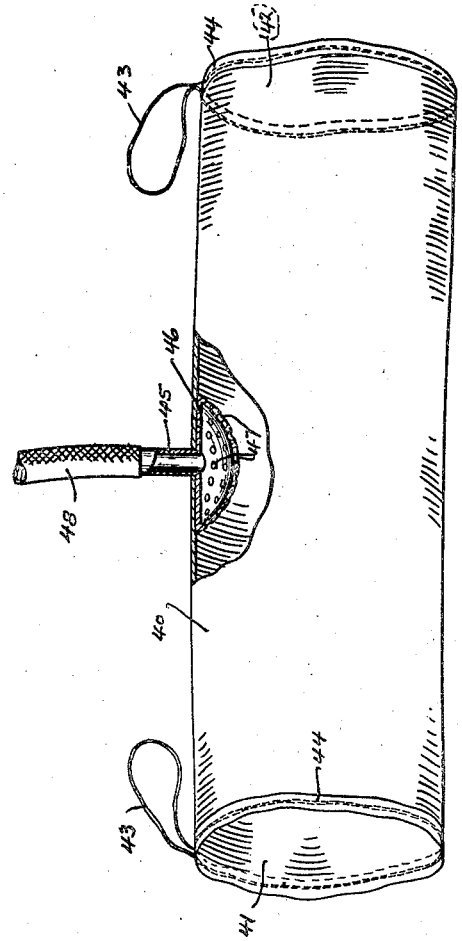
Fig. 8 is a perspective view of another form of invention, partly in section.

Referring to the form of invention shown in Figs. 1 and 2, my device comprises a body 10, preferably of substantially non-porous material, such as rubberized cloth, treated silk, canvas, or the like. The body is provided with an open end 11. The end 11 is preferably provided with means for changing the size of the opening therein. Such means may comprise a draw string 12 passing through a hem 13 formed at this end of the body 10. The body is provided with a head 14 of substantially non-porous material which is secured to the body 10 in any suitable manner. Attached to the head is a connecting pipe 15, which is preferably flexible.

My device is designed to be used in connection with a household vacuum cleaner, such as that shown at 16 in Fig. 2. The connecting pipe 15 is designed to be secured to the attachment opening of the vacuum cleaner when my device is to be used.

In the form of invention shown in Fig. 3, I show a suction chamber 20, which is provided with an outlet pipe 21. This suction chamber is arranged within the body 10 of the device and is preferably secured to the head 14 thereof. The chamber is provided with a top wall 22 in which are formed a plurality of openings 23, through which air, drawn out of the body 10, will enter the chamber 20 and pass thence through the outlet pipe 21. The function of the air chamber 20 is to keep the articles being renovated from being drawn into close contact with the outlet opening in the head and thus partially restricting the opening. The chamber causes the suction produced upon the articles being renovated to be more evenly distributed over the head 14.

In Fig. 4 I show another form of device for distributing the action of the suction upon the articles being renovated. This is in the form of a semi-spherically shaped cage or chamber 25, made preferably of interspaced strands of wire 26. An outlet pipe 27 is attached to the cage.

Figure 5:
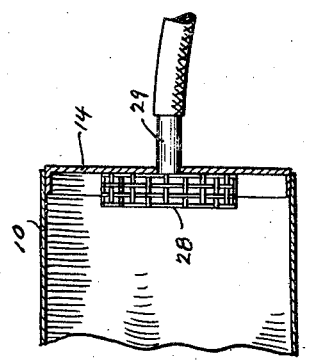

In Fig. 5 is shown a form of device similar to that of Fig. 4, except that the cage or chamber 28 is cylindrical in form. An outlet pipe 29 is attached to the cage.

The form of device shown in Fig. 6 has a body 39 which is preferably made of one piece of fabric. Opposite edges are joined together at the side 30, preferably by means of the stitching which is shown by the broken lines. The end edge 31 of the material is stitched together as shown in Fig. 6, thus forming the closed end of the body of the device. When cutting the material for this form of the device, the material along the edge 31 is cut back at each side of the folded edge 32, whereby material is left for forming a connecting pipe 33. The material along the edge 34 of this pipe may be secured together by stitching. The end 35 in this form of the device is open for the reception of articles to be renovated.

The form of device shown in Fig. 7 is provided with an open end 36 and with a closed end 37. The connecting pipe 38 is secured to the side of the body in any suitable position.

Figure 9:
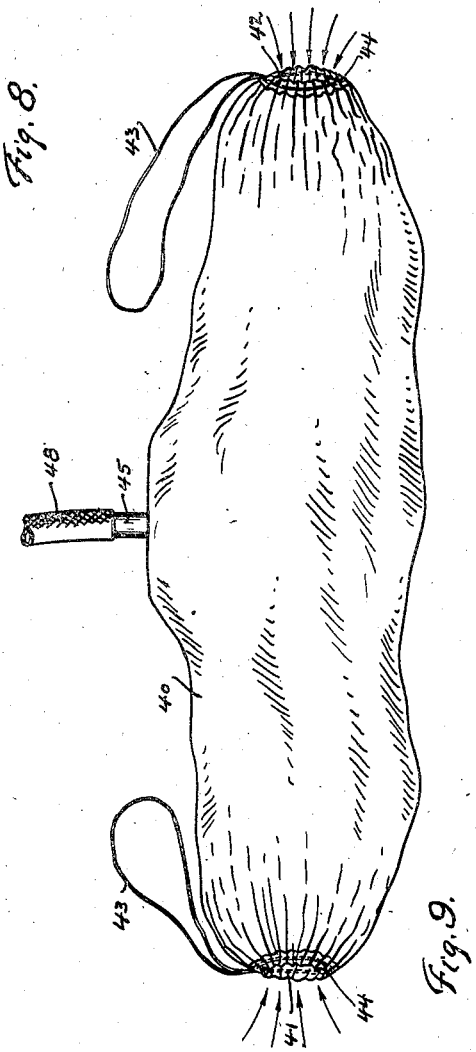
Fig. 9 is a perspective view of the form of device shown in Fig. 8 when in use.

Referring now to the form of the invention shown in Figs. 8 and 9, 40 is the body of the device which is provided with an open end 41 and with an opposite, open end 42. Each end is preferably provided with a draw string 43 passing through a hem 44, whereby the openings in these ends may be reduced, as shown in Fig. 9, after the articles being renovated have been placed within the body. In this form of invention, I arrange the outlet pipe 45 preferably midway the length of the body, so that when suction is applied to the device, air will be drawn therein from both ends of the body, as shown by the arrows in Fig. 9. In this form of the device, I also show another form of air chamber 46 which is spherically formed and which is provided in its exposed wall with a plurality of openings 47, whereby the suction produced in the pipe 45 will be more evenly distributed. A flexible connection 48 serves as a means for attaching the device to the suction side of a vacuum cleaner.

From the foregoing, it will be obvious that when articles are placed within the body of any of the forms of my device, and suction applied to it by means of the connection pipes shown and described, the atmospheric pressure will serve to force the body of the device into close contact with the articles, thereby causing the air passing into the body to be drawn through the articles, so that the dust contained therein will be quickly removed therefrom. Thus the article will not only be cleaned, but aerated as well. When suction is applied to my device, the articles contained therein will be drawn toward the part thereof where suction is applied, or the part of the device where suction is applied will be drawn toward the articles. I have found that it is preferable to reduce the opening through which air passes into the body after the articles to be renovated have been placed therein, and this is preferably done by means of the draw strings shown and described. By reducing the inlet opening to the body, the velocity of the air is somewhat increased and greater efficiency is thus obtained.

While a body and head made of non-porous material will, of course, give the highest efficiency, it is within the scope of my invention to make the body either partly or wholly of porous or semi-porous material. By non-porous material, I mean fabric which is substantially impervious to air when under the number of inches of vacuum ordinarily created by the commercial vacuum cleaner.

Obviously, some modifications of the details herein shown and described may be made without departing from the spirit of my invention or the scope of the appended claims, and I do not, therefore, wish to be limited to the exact embodiment herein shown and described, the forms herein shown and described being merely the preferred forms thereof.

Having thus described my invention, what I claim is:

1. A renovating device comprising a collapsible body portion for holding objects to be renovated, the body portion being formed with an opening through which the objects to be renovated may be inserted, and a separate, non-collapsible chamber portion formed with a plurality of air openings in communication with the body portion, such chamber portion being formed with an outlet for connection with a suction device.

2. A renovating device comprising a collapsible body formed with an opening through which objects to be renovated may be inserted and also formed with an outlet for connection with a suction device, and means for reducing the size of the opening when suction is to be applied.

3. A renovating device provided with an opening through which articles to be renovated may be inserted, and being formed of substantially non-porous, flexible material, and also provided with an outlet for connection with a suction device, the walls of the device being adapted to be collapsed toward the articles placed therein when suction is applied at the outlet.

4. A renovating device comprising a suction pipe adapted to be attached to a suction connection, flexible means adapted to receive the articles to be renovated, said flexible means being open on the side of the articles opposite said suction pipe to permit air to be drawn through the articles to be renovated, and being otherwise airtight whereby when air is drawn through the device the external atmospheric pressure will draw substantially all portions of said flexible means into close contact with the articles to be renovated.

5. A renovating device comprising a collapsible body formed with an opening through which objects to be renovated may be inserted and also formed with an outlet for connection with a suction device, means for reducing the size of the opening when suction is to be applied, and a separate, non-collapsible air chamber formed with a plurality of air openings and connected with the outlet.

6. A renovating device provided with an opening through which articles to be renovated may be inserted, and being formed of substantially non-porous, flexible material, and also provided with an outlet for connection with a suction device, the walls of the device being adapted to be collapsed toward the articles placed therein when suction is applied at the outlet, and means for reducing the size of the opening when suction is to be applied.

7. A renovating device comprising a suction pipe adapted to be attached to a suction connection, flexible means adapted to receive the articles to be renovated, said flexible means being on the side of the articles opposite said suction pipe to permit air to be drawn through the articles to be renovated, and being otherwise airtight, and means for reducing the size of the opening when suction is to be applied, whereby when air is drawn through the device the external atmospheric pressure will draw substantially all portions of said flexible means into close contact with the articles to be renovated.

In testimony whereof, I have hereunto signed by name.

ABRAHAM N. SPANEL.